United States Patent [19]
Takagi

[11] Patent Number: 5,269,584
[45] Date of Patent: Dec. 14, 1993

[54] REINFORCEMENT WITH TUBULAR PORTION FOR RECEIVING BOLT

[75] Inventor: Masahiro Takagi, Kanagawa Pref., Japan

[73] Assignee: Nissan Motor Co., Ltd., Yokohama, Japan

[21] Appl. No.: 897,060

[22] Filed: Jun. 11, 1992

[30] Foreign Application Priority Data

Jun. 17, 1991 [JP] Japan .................................. 3-144799

[51] Int. Cl.$^5$ ............................................ B62D 25/00
[52] U.S. Cl. .................................... 296/203; 296/202; 16/2; 16/DIG. 40; 16/DIG. 43; 248/213.1; 403/192; 52/787; 52/797
[58] Field of Search ................. 296/203–205, 296/29, 30, 35.1, 202; 16/2, 43, DIG. 40, DIG. 43, 382, 384; 471/546, 547, 432, 437; 403/192, 345; 248/300, 213.1; 52/787, 797; 280/796–798

[56] References Cited

U.S. PATENT DOCUMENTS

| | | | |
|---|---|---|---|
| 2,060,970 | 11/1936 | Belden | 16/2 |
| 2,113,403 | 4/1938 | Harmon | 280/797 X |
| 2,194,356 | 3/1940 | Eklund | 280/797 |
| 2,293,399 | 8/1942 | Moecker, Jr. et al. | 52/787 |
| 2,327,585 | 8/1943 | Ulrich | 280/797 X |
| 2,797,606 | 7/1957 | Poupitch | 411/437 |
| 3,556,552 | 1/1971 | Deckert | 280/797 X |

FOREIGN PATENT DOCUMENTS

| | | | |
|---|---|---|---|
| 0104468 | 6/1982 | Japan | 296/202 |
| 6710062 | 1/1968 | Netherlands | 52/797 |

Primary Examiner—Dennis H. Pedder
Attorney, Agent, or Firm—Foley & Lardner

[57] ABSTRACT

A reinforcement is comprised of a support member in the form of a waved sheet and a plate member in the form a generally flat sheet and secured to the support member. The support member has a ridge-like bent portion protruding to one side thereof and forming an opening to the other side thereof. The plate member has a ridge-like projection protruding into the opening to close the same while cooperating with the ridge-like bent portion to constitute a tubular portion for rigidly holding two structural members at a predetermined distance from each other and and receiving a bolt extending between the two structural members for attachment of another member to the two structural members.

14 Claims, 3 Drawing Sheets

REINFORCEMENT WITH TUBULAR PORTION FOR RECEIVING BOLT

BACKGROUND OF THE INVENTION

1. Field of the Invention

The present invention relates in general to a reinforcement for a structure such as a vehicle body construction and more particularly to a reinforcement having a tubular portion for rigidly holding two members at a predetermined distance from each other and receiving a bolt extending between the two members.

2. Description of the Prior Art

A prior art reinforcement of the above described kind includes a pair of base plates and a pipe or pipes interposed between the base plates and secured to the base plates at the axial ends thereof by arc welding.

Such arc welding inevitably requires difficult work and therefore is expensive. Further, positioning of the pipe or pipes and the end plates in the case of welding is not easy. Still further, such a pipe is not cheap in cost.

For the above reasons, the prior art reinforcement of the above kind is poor from a productivity and expense view point.

SUMMARY OF THE INVENTION

In accordance with the present invention, there is provided a novel and improved reinforcement which comprises a support member in the form of a waved sheet which has a ridge-like bent portion protruding to one of opposite sides of the support member and forming an opening which opens to the other of the opposite sides of the support member, a plate member joined to the other of the opposite sides of the support member, the plate member being in the form of a generally flat sheet and having a ridge-like projection protruding into the opening of the ridge-like bent portion to close the same while cooperating with the ridge-like bent portion to constitute a tubular portion for rigidly holding the two structural members at a predetermined distance from each other and receiving a bolt extending between the two structural members for attachment of another member to the two structural members.

The above structure is effective for overcoming the above noted disadvantages or shortcomings inherent in the prior art reinforcement apparatus.

It is accordingly an object of the present invention to provide a novel and improved reinforcement of the above described kind which is excellent in productivity and cheap in cost.

It is a further object of the present invention to provide a novel and improved reinforcement of the above described character which, is lightweight but which can effect an excellent rigidity.

It is a further object of the present invention to provide a novel and improved reinforcement of the above described character which can be produced by the employment of pressed metal articles and by spotwelding.

It is a further object of the present invention to provide a novel and improved reinforcement of the above described character which can effect a reduced irregularity in quality.

DESCRIPTION OF THE INVENTION

Figure 1:
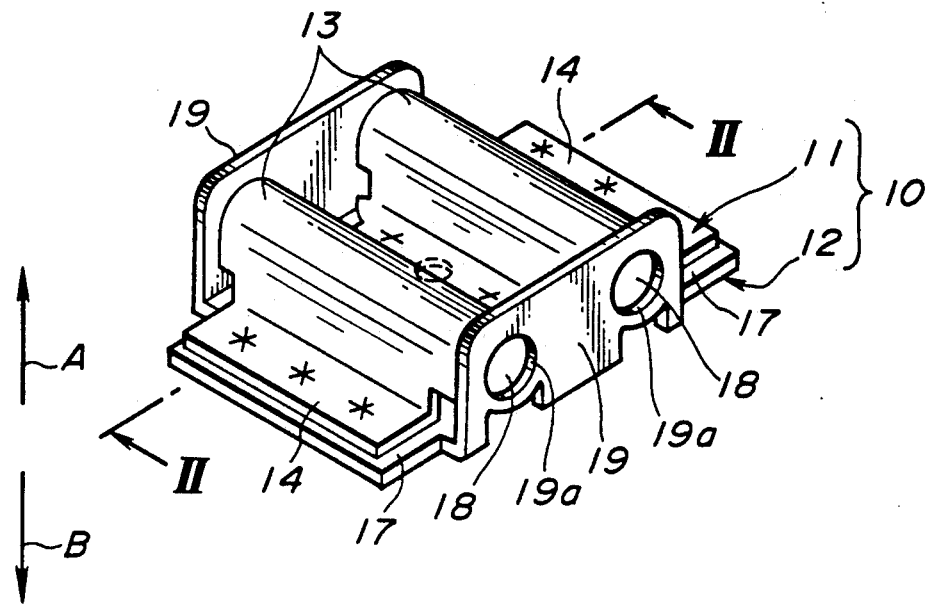
FIG. 1 is a perspective view of a reinforcement according to an embodiment of the present invention.
Figure 2:
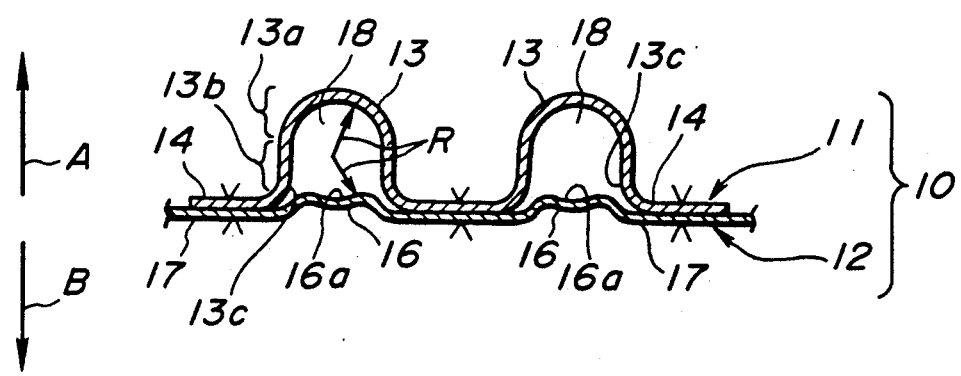
FIG. 2 is a sectional view taken along the line II—II of FIG. 1.
Figure 3:
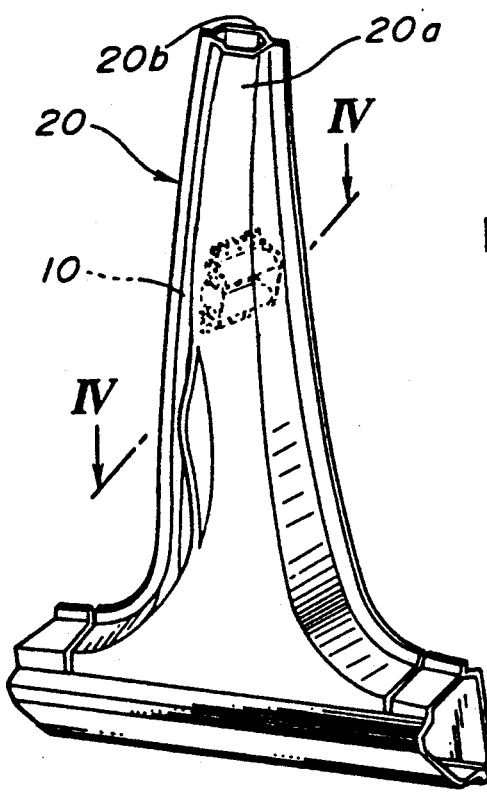
FIG. 3 is a perspective view of a vehicle body construction incorporating the reinforcement of FIG. 1.

Referring first to FIGS. 1 through 3, a reinforcement according to the present invention is generally designated by 10 and includes a support member 11 and a plate member 12.

The support member 11 is in the form of a waved sheet and has two parallel ridge-like bent portions 13 at a predetermined distance therebetween. The bent portions 13 are so shaped as to protrude to one of opposite sides of the support member 11, i.e., to the side "A" and form openings 13c to the other of the opposite sides, i.e., to the side "B". More specifically, each bent portion 13 has a U-like cross section and consists of a semicylindrical end wall 13a and a pair of parallel side walls 13b. The support member 11 has at the remote sides of the bent portions 13 a pair of planar joining portions 14 at which it is secured or joined to the plate member 12. The radius "R" of curvature of the semicylindrical end wall 13a is determined in accordance with the diameter of attaching bolts 15 which are to extend through the reinforcement 10 as will be described hereinafter. The parallel side walls 13b are of such a height that is a little larger than the radius "R". The support member 11 is formed by press working from a sheet metal which is thicker than that from which the plate member 12 is formed.

The plate member 12 is formed by press working with two parallel ridge-like projections 16 which are so positions as to respectively coincide with the bent portions 13 of the support member 11 and further formed with joining portions 17 at the remote sides of the projections 16. The projections 16 are so shaped as to protrude into the openings 13c of the bent portions 13 and are formed at the tops thereof with furrow-like recessed portions 16a such that the furrow-like recessed portions 16a cooperate with the semicylindrical end walls 13a to define tubular portions 18 of a radius "R" for receiving the attaching bolts 15 or through which the attaching bolts 15 extend as will be described again hereinafter.

The plate member 12 is formed by bending (i.e., a kind of press working) with a pair of upstanding end plate portions 19 at the opposite longitudinal ends of the furrow-like recessed portions 16a. The end plate portions 19 are arranged at a predetermined distance from each other and have openings 19a which are axially aligned with the tubular portions 18. By making the support member 11 abuttingly engage at the opposite ends with the inner sides of the end plate portions 19 while making the ridge-like projections 16 fit in the openings 13c of the bent portions 13, the openings 19a of the end plate portions 19 are positioned in place relative to the bent portions 13 of the support member 11, i.e., the openings 19a are axially aligned with the tubular portions 18, respectively.

The support member 11 and the plate member 12 are spot-welded at the joining portions 14 and 17 and at the portions between the bent portions and between the projections 16.

Figure 4:
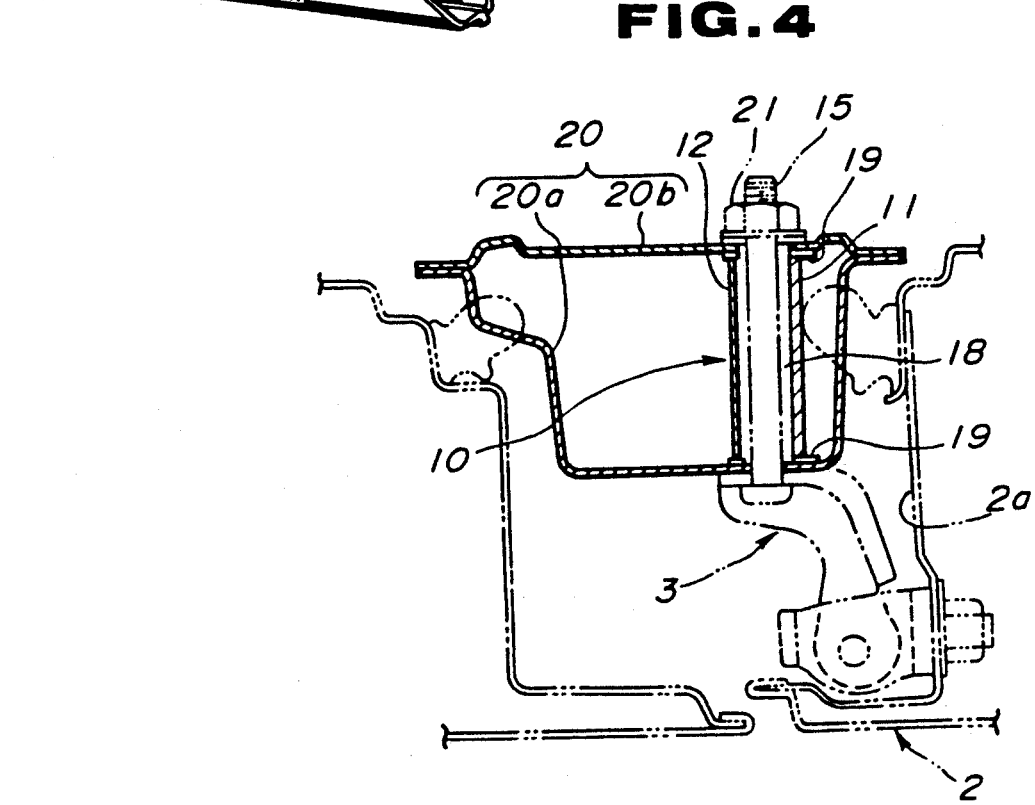
FIG. 4 is a sectional view taken along the line IV—IV of FIG. 3.

In use, as shown in FIGS. 3 and 4, the reinforcement 10 is installed in place within a center pillar (vehicle body frame member) 20 of a box-like closed cross section which is constituted by an outer panel 20a and an inner panel 20b such that the attaching bolts 15 extend through a hinge member (vehicle functional part) 3 of a rear door 2, the outer panel 20a, the tubular portions 18 of the reinforcement 10 and through the inner panel 20b to be screwed into nuts 21. By the attaching bolts 15 and the nuts 21, the hinge member 3 is secured to the center pillar 20 at the side of the outer panel 20a, i.e., at the side of one of the end plate portions 19 (refer to FIG. 3).

From the foregoing, it will be understood that the reinforcement of this invention is cheap in cost since it does not require an expensive tubular member and arc welding but can be produced by the employment of pressed metal articles and by spot-welding.

It will be further understood that the reinforcement 10 of this invention is excellent in productivity since during assembly the support member 11 and the plate member 12 can be easily positioned in place relative to each other due to the effect of the ridge-like bent portions 13, the ridge-like projections 16 and the end plate portions 19.

Figure 5:
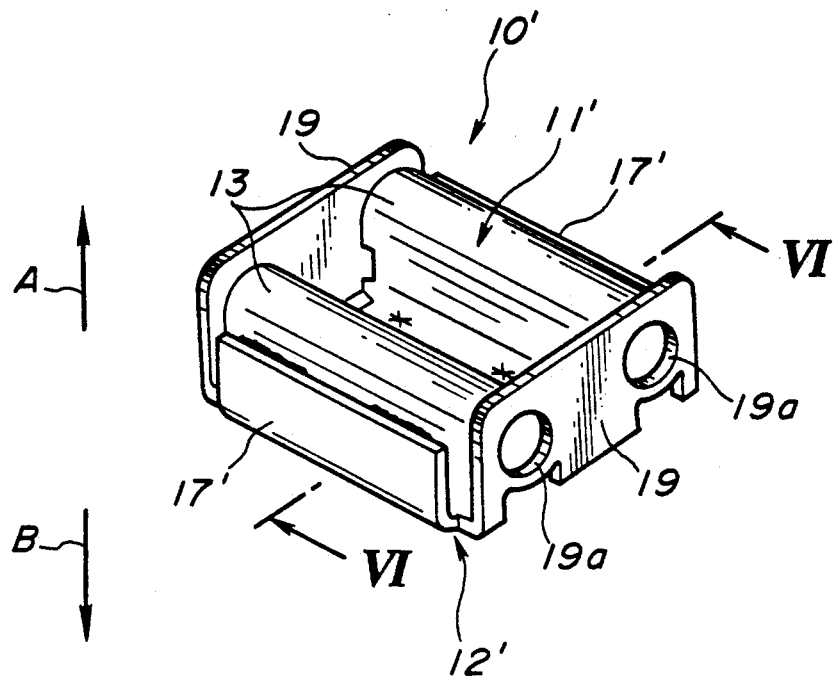
FIG. 5 is a view similar to FIG. 1 showing another embodiment.
Figure 6:
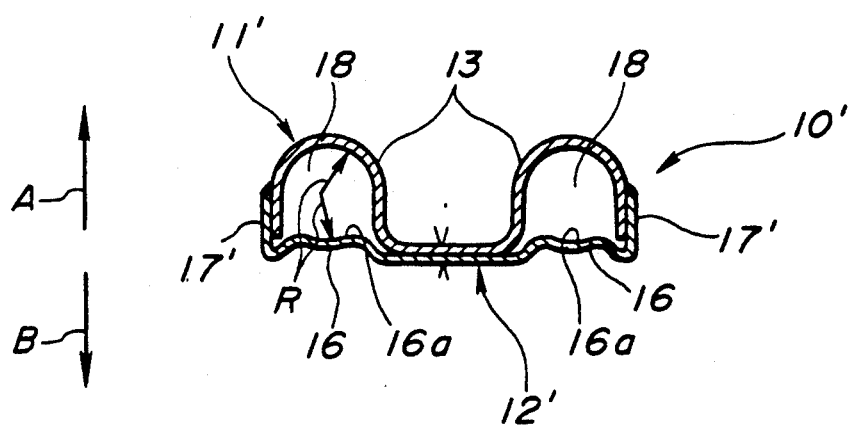
FIG. 6 is a sectional view taken along the line VI—VI of FIG. 4.

It will be further understood that the reinforcement 10 of this invention is light in weight but can effect an excellent structural rigidity since the support member 11 is formed from a sheet metal which is thicker than the sheet metal from which the plate member 12 is formed. That is, since support member 11 receives a larger axial force from the bolts 15 than does plate member 12, it contributes more significantly to the structural rigidity of the reinforcement 10. Thus, by making support member 11 thicker than plate member 12, the overall structural rigidity is improved FIGS. 5 and 6 show another embodiment. This embodiment differs from the previous embodiment in that the support member 11' is not provided with the joining portions 14 and the joining portions 17' of the plate member 12' are bent toward the ridge-like bent portions 13 of the support member 11' such that the support member 11' is fittingly surrounded by the end plate portions 19 and the joining portions 17' and thus fitted in the plate member 12'. The support member 11' and the plate member 12' are spot-welded at the portions between the bent portions 13 and between the projections 16 and joined by arc welding at the joints between the edges of the joining portions 17' and the bent portions 13. Except for the above, this embodiment is substantially similar to the previous embodiment.

This embodiment can effect an easier positioning of the support member 11' and the plate member 12' relative to each other and reduces irregularity in quality. Further, this embodiment can be compact in size and therefore can be installed in a more limited space. Further, the arc welding can be done with efficiency since the portions to be welded are straight.

While the present invention has been described and shown as above, it is not for the purpose of limitation. For example, the front pillar may be another vehicle body frame member such as a front pillar. Further, the hinge member may be another vehicle functional component such as a steering constituent part or member.

What is claimed is:

1. A reinforcement for installation between two structural members, comprising:

a support member in the form of a waved sheet and having a ridge-like bent portion protruding to one of opposite sides of said support member and forming an opening which opens to the other of the opposite sides of said support member;

a plate member joined to the other of the opposite sides of said support member;

wherein said plate member is in the form of a generally flat sheet and has a ridge-like projection protruding into said opening of said ridge-like bent portion to close said opening while cooperating with said ridge-like bent portion to constitute a tubular portion for rigidly holding the two structural members at a predetermined distance from each other and for receiving a bolt extending between the two structural members for attachment of another member to the two structural members;

wherein said plate member has at each opposite longitudinal end of said ridge-like projection an upstanding end plate portion abuttingly engaging a respective opposite longitudinal end of said ridge-like bent portion and said plate member is formed with openings axially aligned with said tubular portions for allowing insertion of the bolt.

2. The reinforcement according to claim 1, wherein said support member is formed from a sheet metal which is thicker than that from which said plate member is formed.

3. The reinforcement according to claim 1, wherein said ridge-like bent portion has a U-like cross section and includes a semicylindrical end wall protruded to said one of opposite sides of said support member and a pair of parallel side walls.

4. The reinforcement according to claim 3, wherein said projection is formed at the top thereof with a furrow-like recessed portion which cooperates with said semicylindrical end wall of said support member to constitute said tubular portion.

5. The reinforcement according to claim 4, wherein said support member and said plate member have planar joining portions at the side of said ridge-like bent portion and at the side of said ridge-like projection, said support member and said plate member being spot-welded at said joining portions.

6. A reinforcement for installation between two structural members comprising:

a support member in the form of a waved sheet and having a ridge-like bent portion protruding to one of opposite sides of said support member and forming an opening which opens to the other of the opposite sides of said support member; and a plate member joined to the other of the opposite sides of said support member;

wherein said plate member is in the form of a generally flat sheet and has a ridge-like projection protruding into said opening of said ridge-like bent portion for positioning said plate member in place relative to said support member while cooperating with said ridge-like bent portion to constitute a tubular portion for rigidly holding the two structural members at a predetermined distance from each other and for receiving a bolt extending between the two structural members for attachment of another member to the two structural members;

wherein said ridge-like bent portion has a U-like cross section and includes a semicylindrical end wall protruded to said one of opposite sides of said support member and a pair of parallel side walls;

wherein said projection is formed at the top thereof with a furrow-like recessed portion which cooperates with said semicylindrical end wall of said support member to constitute said tubular portion.

7. A reinforcement for installation between two structural members for attachment of another operating member to the two structural members, comprising:

a support member in the form of a waved sheet and having two ridge-like bent portions protruding to one of opposite sides of said support member and forming openings which open to the other of the opposite sides of said support member; and a plate member joined to the other of the opposite sides of said support member;

wherein said plate member is in the form of a generally flat sheet and has two ridge-like projections each protruding into one of said openings of said ridge-like bent portions for positioning said plate member in place relative to said support member while cooperating with said ridge-like bent portion to define two tubular portions for rigidly holding the two structural members at a predetermined distance from each other and for receiving two bolts extending between the two structural members for attachment of another member to the two structural members;

wherein said ridge-like bent portions each have a U-like cross section and each include a semicylindrical end wall protruded to said one of opposite sides of said support member and a pair of parallel side walls;

wherein said projections are each formed at the tops thereof with a furrow-like recessed portion which cooperates with said semicylindrical end walls of said support member to constitute said tubular portions.

8. The reinforcement according to claim 7, wherein said support member is formed from a sheet metal which is thicker than that from which said plate member is formed.

9. The reinforcement according to claim 8, wherein said plate member has at the opposite longitudinal ends of said ridge-like projections a pair of upstanding end plate portions abuttingly engaging the opposite longitudinal ends of said ridge-like bent portions and formed with openings axially aligned with said tubular portions for allowing insertion of the bolts.

10. The reinforcement according to claim 9, wherein said support member and said plate member each have a first planar joining portion between said ridge-like bent portions and between said ridge-like projections, respectively and said support member and said plate member are spot-welded to each other at said first joining portions.

11. The reinforcement according to claim 10, wherein said support member and said plate member each have two second planar joining portions each of said second planar joining portions of said support member extend opposite to each other and outward from one of said ridge-like bent portions to form peripheral sides of said support member, each of said second planner joining portions of said plate member extend opposite to each other and outward from said ridge-like projections to form peripheral sides of said plate member, and said support member and said plate member are spot-welded to each other at said second joining portions.

12. The reinforcement according to claim 10, wherein said plate member has a pair of upstanding joining portions each of which are fittingly in contact with one of said pair of parallel side walls of said bent portions which is located outwardly relative to the other of said pair of parallel side walls, and said support member and said plate member are joined to each other by an arc weld at joints between said upstanding portions of said plate member and a respective one of said one of said pair of parallel side walls of said bent portions of said support member.

13. A vehicle body construction comprising:

a frame member of a box-like closed section, including an outer panel and an inner panel;

a reinforcement installed within said frame member and between said outer panel and said inner panel;

wherein said reinforcement includes a support member in the form of a waved sheet and having a ridge-like bent portion protruding to one of opposite sides of said support member and forming an opening which opens to the other of the opposite sides of said support member, and a plate member joined to the other of the opposite sides of said support member, said plate member being in the form of a generally flat sheet and having a ridge-like projecting protruding into said opening of said ridge-like bent portion for positioning said plate member in place relative to said support member while cooperating with said ridge-like bent portion to constitute a tubular portion for rigidly holding said outer panel and said inner panel at a predetermined distance from each other;

a vehicle functional component arranged at the side of one axial end of said tubular portion; and bolts extending through said tubular portion between said outer panel and said inner panel for attaching said vehicle functional component to said vehicle frame member;

wherein said ridge-like bent portion has a U-like cross section and includes a semicylindrical end wall protruded to said one side of opposite sides of said support member and a pair of parallel side walls;

wherein said projection is formed at the top thereof with a furrow-like recessed portion which cooperates with said semicylindrical end wall of said support member to constitute said tubular portion.

14. A reinforcement for installation between two structural members, comprising:

a support member in the form of a waved sheet and having a ridge-like bent portion protruding to one of opposite sides of said support member and forming an opening which opens to the other of the opposite sides of said support member;

a plate member joined to the other of the opposite sides of said support member;

wherein said plate member is in the form of a generally flat sheet and has a ridge-like projection protruding into said opening of said ridge-like bent portion to close said opening while cooperating with said ridge-like bent portion to constitute a tubular portion for rigidly holding the two structural members at a predetermined distance from each other and for receiving a bolt extending between the two structural members for attachment of another member to the two structural members;

wherein said support member is formed from a sheet metal which is thicker than that from which said plate member is formed;

wherein said plate member has at each opposite longitudinal end of said ridge-like projection an upstanding end plate portion abuttingly engaging a respective opposite longitudinal end of said ridge-like bent portion and said plate member is formed with openings axially aligned with said tubular portions for allowing insertion of the bolt.

* * * * *